United States Patent [19]
Quinn et al.

[11] 3,776,016
[45] Dec. 4, 1973

[54] PUNCHING AND EXTRUSION DIE

[75] Inventors: Lawrence R. Quinn, Bloomfield Hills; Max J. Bielenberg, Detroit, both of Mich.

[73] Assignee: Roura Iron Works, Inc., Detroit, Mich.

[22] Filed: June 20, 1972

[21] Appl. No.: 264,652

[52] U.S. Cl. .................. 72/327, 72/332, 72/333, 72/336
[51] Int. Cl. ............................................. B21d 31/02
[58] Field of Search .................. 72/324, 327, 332, 72/333, 336

[56] References Cited
UNITED STATES PATENTS

| | | | |
|---|---|---|---|
| 1,623,325 | 4/1927 | Wetmore | 72/327 |
| 3,494,168 | 2/1970 | Williamson | 72/335 |
| 3,507,140 | 4/1970 | Tassaro | 72/327 |
| 2,848,805 | 8/1958 | Brink | 72/324 |
| 2,887,157 | 5/1959 | Rehdorf | 72/327 |

Primary Examiner—Charles W. Lanham
Assistant Examiner—James R. Duzan
Attorney—Gerald E. McGlynn, Jr. et al.

[57] ABSTRACT

Hole forming apparatus comprising a punch having a cutting portion at its leading end for cutting and punching a hole in a metal sheet, and a forming portion following said cutting portion for shaping the material of the metal sheet surrounding the hole, the cutting portion comprises a cutter extending from the leading end of the punch and the forming portion includes a flared section providing a material deforming shoulder, a cylindrical section having a greater lateral dimension than the cutter, and an outwardly radiused section, and a die which cooperates with the punch for shaping the material of the metal sheet surrounding the hole. Also disclosed is a tooth guided rocker and platform assembly for self dumping hoppers and the like wherein the teeth of the rockers are guided into and out of holes formed by the hole forming apparatus.

9 Claims, 6 Drawing Figures

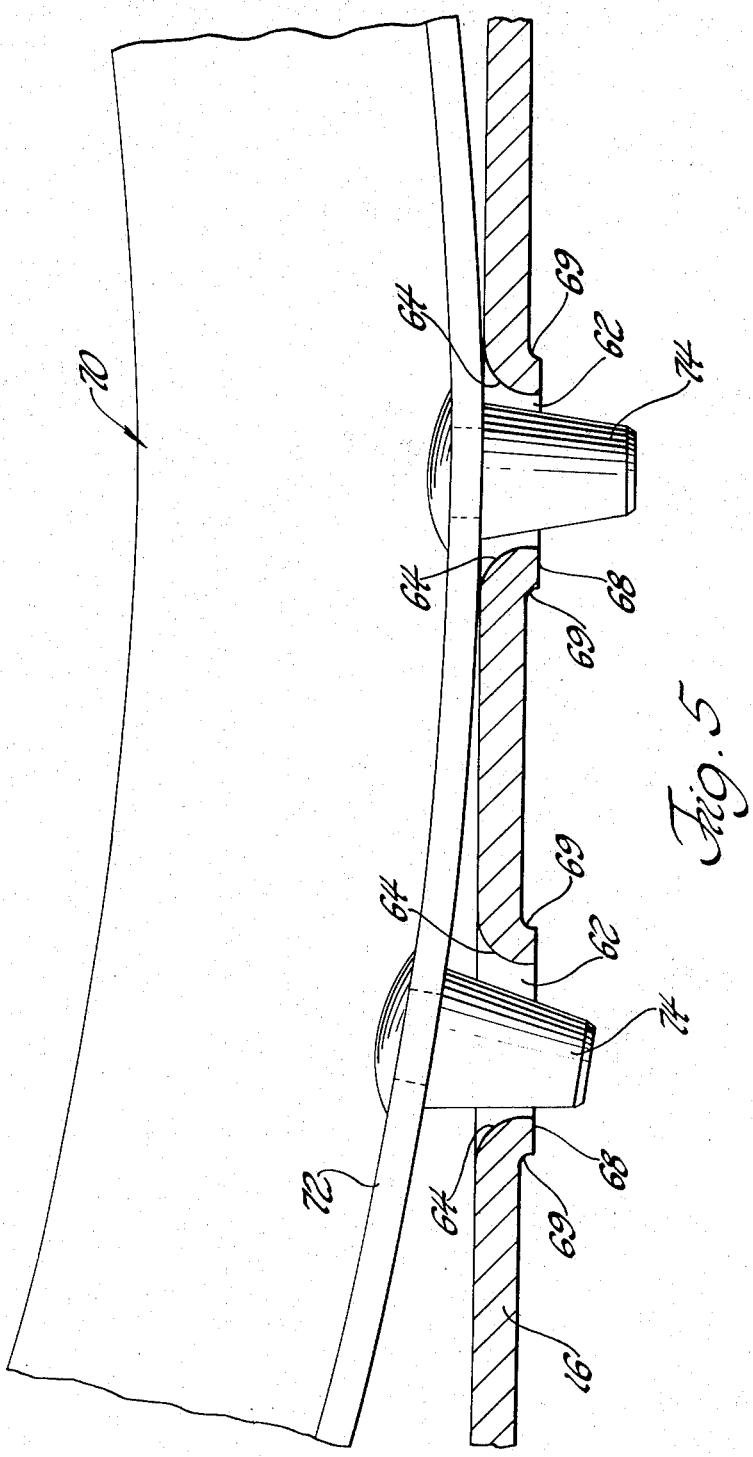

PUNCHING AND EXTRUSION DIE

This invention relates generally to apparatus for forming holes in metal sheet material, and is particularly concerned with a punch and die assembly for punching a hole in metal sheet material and extruding the material surrounding the hole to a desired configuration and to apparatus such as self dumping hoppers utilizing a platform member having such holes formed therein.

U.S. Pat. No. 2,519,153 discloses a self dumping hopper having a body supported on a platform for movement between an upright loading position and a tilted dumping position. For controlling the movement of the hopper between positions, teeth or projections on the hopper body engage holes formed in the platform. Each tooth or projection moves into and out of the hole in the platform during movement of the hopper and, consequently, very high stresses are experienced by the material surrounding the holes. Furthermore, the configurations of the holes are important because the teeth must be capable of moving into and out of the holes with a reasonably smooth, uninterrupted rolling motion. An additional requirement for proper operation of the hopper is that the holes in the platform be free of burrs.

Heretofore, holes having a substantially cylindrical configuration have proven somewhat unsuitable for application of the general type referred to in the preceding paragraph because the slightest amount of misalignment will cause the teeth to clash against the edges of the holes thereby interfering with the movement of the hopper. To merely make the holes larger would create the possibility of a greater amount of misalignment and would be therefore unacceptable. Additionally, most of the presently available methods and apparatus for forming holes have the disadvantages that burrs must be removed from the material surrounding the holes after the hole forming operation, and the configurations of the material surrounding the holes do not adequately increase the bearing strength of the material so that heavier gauge or higher strength meterial is necessary merely to prevent failure at the holes. Examples of prior art hole forming apparatus are disclosed in the following U.S. Pat. Nos.: 939,342; 1,979,748; 2,198,986; 2,306,658; 2,887,157; and 3,494,168.

An object of this invention is to provide hole forming apparatus for forming a hole in high strength metal sheet material in such a manner that no burrs project into the hole from the surrounding material following the hole forming operation, and wherein the material surrounding the hole is formed into a configuration that will withstand high bearing stresses and that will permit smooth operation of a toothed rocking member on a platform having holes formed therein for receiving the teeth of the rocking member.

Another object of this invention is to provide a hole forming apparatus including a punch having a cutting portion at its leading end for cutting and punching a hole in a metal sheet and a forming portion following the cutting portion for shaping the material of the metal sheet surrounding the hole; the cutting portion comprising a cutter extending from the leading end of the punch and a forming portion including a flared section providing a material forming shoulder, a cylindrical section having a greater lateral dimension than the cutter, and an outwardly radiused section; and a die for cooperation with the punch for shaping the material of the metal sheet surrounding the hole.

Another object is to provide a platform member for a rocker and platform assembly comprising a load supporting and carrying surface having holes formed therein, wherein the material at the periphery of the holes includes a first section bounded by the platform member and substantially in the plane thereof and a second section comprising a reinforcing collar extending from one of the surfaces of the platform member for increasing the thickness of the material surrounding the holes; the first section having a substantially arcuate inner surface and the second section having a substantially cylindrical inner surface and substantially arcuate outer surface.

Other objects and features of the invention will become apparent from the following description taken in connection with the accompanying drawings wherein:

FIG. 5 is an elevational view, partly in cross-section, of a toothed rocker member and a platform formed with a series of holes for guiding the teeth of the rocker member.

Figure 1:
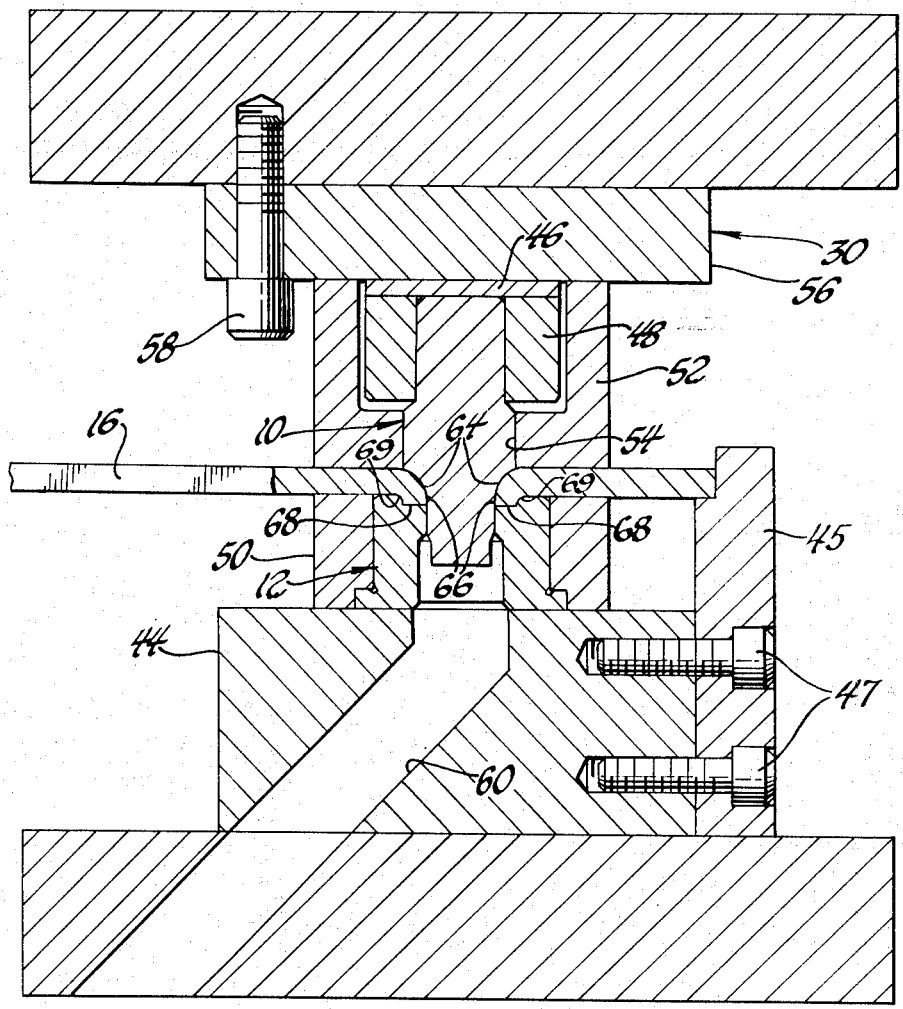
FIG. 1 is a cross sectional view of hole forming apparatus including a punch and die assembly constructed in accordance with the instant invention.
Figure 2:
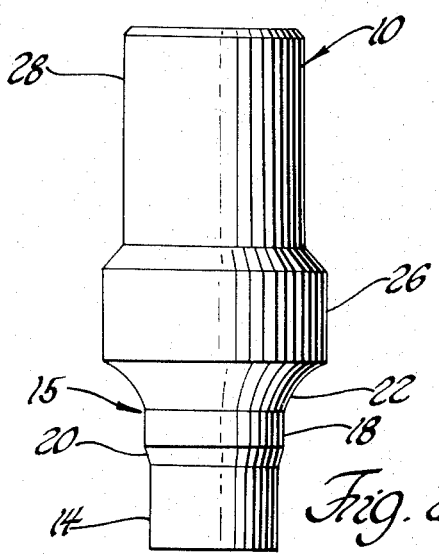
FIG. 2 is an elevational view of the punch of the punch and die assembly of FIG. 1.
Figure 3:
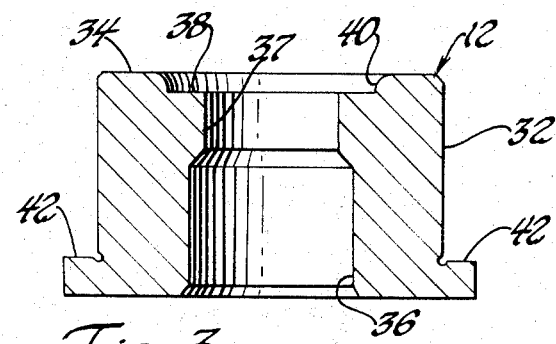
FIG. 3 is a cross-sectional elevational view of the die of the punch and die assembly of FIG. 1.

In the drawings, a hole forming apparatus is illustrated including a punch and die designated collectively by reference numerals 10 and 12 respectively.

The punch 10 includes a cutting portion comprising a cutter 14 at its leading end for cutting and punching a hole in a metal sheet. Following the cutter 14 is a forming portion indicated at 15 for shaping the material of the metal sheet surrounding the hole. The forming portion 15 includes a flared section 20 providing a material deforming shoulder which has the general configuration of an inverted truncated cone. The flared section 20 flares outwardly and merges into a cylindrical section 18 which has a greater lateral dimension than the cutter 14, that is, the diameter of the cylindrical section 18 is larger than the diameter of the cutter 14. The cylindrical section 18 meets the terminal section of the forming portion 15 which is an outwardly radiused section 22. Following the radiused section 22 is a built up or enlarged section 26 which provides strength to the radiused section 22 while the punch 10 is used. The punch 10 also includes a shank 28 for mounting the punch 10 in any appropriate force generating mechanism such as the mechanical press generally indicated at 30.

The die 12 is designed to cooperate with the punch for shaping the material of the sheet metal surrounding the hole. The die 12 includes an upper surface 34 having a cylindrical recess 38 formed therein for receiving at least a portion of the material surrounding the hole, and a channel or bore 36 in communication with the recess 38 for receiving the cut material from the metal sheet. An arcuate shoulder 40 defines the outer periphery of the recess 38 and aids in shaping the material of the metal sheet surrounding the hole during a hole forming operation. The channel 36 also includes a pilot portion 37 for guiding at least a portion of the forming portion 15 of the punch 10 to the die 12. An annular flange 42 is included at the base of the die 12 for mounting the die in axial alignment with the punch 10.

Figure 4:
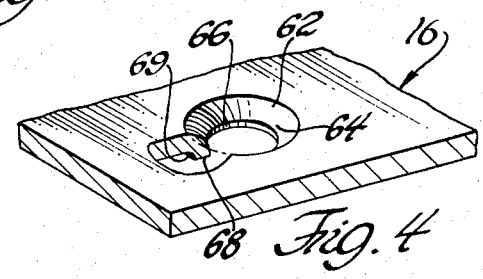
FIG. 4 is a partially cut-away perspective view of a structural member having a hole formed therein with the material surrounding the hole having a configuration according to the invention.

The platform member 16 includes a load supporting and carrying surface having holes 62 formed therein by utilization of the punch 10 and die 12 as shown in FIG. 4. The platform member 16 is especially suited for use in the type of self dumping hopper disclosed in U.S. Pat. No. 2,519,153, because the configuration of the holes provide for smoother operating of the hopper as is set forth below. Furthermore, the holes are formed in such a manner that no burrs project into the holes from the surrounding material, and the material surrounding the holes is thickened so that they will withstand higher bearing stresses exerted by the teeth or projections on the hopper thereby permitting a lighter gauge steel sheet to be used while maintaining the same strength at the holes afforded by a steel sheet of heavier gauge.

The material at the periphery of the hole 62 includes a first section 64 having a substantially arcuate inner surface bounded by the platform member 16 and substantially in the plane thereof, and a second section 66 having a substantially cylindrical inner surface and formed by a reinforcing collar 68 projecting beneath the plane of the member 16 for increasing the thickness of the material immediately surrounding the hole 62. The reinforcing collar 68 also includes a substantially arcuate outer surface 69.

One of the primary purposes of this invention is to utilize the platform member 16 in an assembly as best shown in FIG. 5. The assembly generally shown at 70 includes an arcuate rocker member 72 and the platform member 16 which elements may be described as a section of the curved rocker portion of the hopper and a section of the platform of the type disclosed in U.S. Pat. No. 2,519,153. Accordingly, the arcuate rocker member 72 is adapted to rock across the surface of the platform member 16. The arcuate rocker member 72 includes a plurality of projections 74 in the form of truncated conical teeth, and the platform member 16 includes a plurality of holes 62 therein having the configuration as described for receiving the projections 74 and thereby guiding and retaining the arcuate member as it moves over the platform member 16 with a rolling motion. The projections or teeth 74 are normally arranged linearly on the arcuate member at spaced intervals to mesh with the similarly spaced holes 62 on the platform member 16.

One of the important advantages achieved by utilizing a platform member 16 having holes 62 of this configuration is that the projections or teeth 74 are guided into the holes 62 by the arcuate surface 64 thereby allowing a smoother rocking motion between the arcuate member and the platform member. In other words, the inner surfaces of the first and second sections 64 and 66, respectively, form a substantially bell-shaped opening having a substantially flat bottom surface 68 spaced from the plane of the sheet 16 whereby the teeth on the rocker are guided into and out of the holes when the teeth engage the arcuate surface of the first section. Furthermore, the arcuate section 62 increases the size of the entryway into the hole, therefore, misalignment problems are not as critical as those encountered with holes of a more conventional configuration. Even though the size of the holes are increased at the entryway there is no additional misalignment problem involved because the size of the major portion of the hole 62 remains unchanged.

In operation, the punch 10 and die 12 are mounted in a mechanical press 30 as shown in FIG. 1. The mechanical press 30 includes a vertically movable head 46 and a tool chuck 48 for receiving the shank 28 of the punch 10. The die 12 is mounted on a worktable or other support designated by reference numeral 44 in axial alignment with the punch 10 and is held securely in position by block 50 which is fastened to the worktable 44 and tightly clamps against the annular flange 42 on the die 12.

The platform member 16 is inserted in the press 30 and abuts stop 45 which is mounted on the worktable 44 by fasteners 47. A vertically movable guide head 52 moves into engagement with the platform member 16 and clamps it in position against the upper surface of the block 50 on the worktable 44. When the press 30 is actuated the punch 10, mounted in vertically movable head 46, moves downwardly and is guided in bore 54 of guide head 52 to engage the platform member 16.

Initially the cutter 14 engages the platform member 16 to cut and punch a slug of metal from the platform member 16 to form a hole. The cut slug (not shown) passes through the channel 36 formed in the die 12 and enters a discard channel 60 in the worktable 44 which conveys the cut slug away from the work area to a discard area.

After the cutter has formed a hole 62 in the platform member 16 the flared section 20 engages the material surrounding the hole and begins to force or extrude it downwardly into the recess 38 of the die 12. Continued downward movement forces more of the metal into the recess 38 until the radiused section 22 engages the platform member 16 to complete the forming operation. Consequently, the hole takes on the configuration as shown in FIG. 4, that is, the arcuate section 64 formed by the radiused section 22 on the punch 10 is formed on the upper surface of the platform member 16 and the second section 66 having a cylindrical surface formed by the cylindrical section 18 of the punch 10. The reinforcing collar 68 is formed within the recess 38 of the die 12 and includes an arcuate outer surface formed by arcuate shoulder 40 disposed about the periphery of the recess 38 on the die 12. No burrs project into the hole because the edge of the hole as initially punched out by cutter 14 is turned ninety degrees away by the forming portion as indicated at 68 and is forced into engagement with the surface of recess 38.

During the forming operation the punch 10 is held in axial alignment with the guide 12 by means of the pilot portion 37 included in channel 36 which engages the cylindrical portion 18 of the punch 10 as the punch 10 moves to the die 12. Furthermore, the punch 10 is prevented from lateral misalignment during the initial stages of engagement with the platform member 16 by means of the lower 54 in the die head 52.

Following the formation of the hole 62 in platform member 16 the punch 10 is retracted from the die as the vertically movable head 46 draws the punch upwardly to the interior of the press 30. Coordinated with this movement is the upward movement of the guide head 52 which removes the clamping pressure on the platform member 16 which has held it in place against the block 50 on the worktable 44. Following the retraction of the guide head 52 and punch 10 the platform member 16 is lifted slightly upwardly to clear the die and is then removed from the press 30.

While a specific embodiment of the invention has been described and illustrated in the foregoing specification and accompanying drawings, it should be understood that the invention is not limited to the exact construction shown. Alterations and modifications, all falling within the scope and spirit of the invention, will be apparent to those skilled in the art.

The embodiments of the invention in which an exclusive property or privilege is claimed are defined as follows:

1. Hole forming apparatus for punching and forming a reinforced opening of substantially bell-shaped configuration in a substantially flat metal sheet comprising: a punch having a cutting portion at its leading end for cutting and punching a hole in a metal sheet, and a forming portion following said cutting portion; said cutting portion comprising a cutter extending from the leading end of said punch, and said forming portion including a flared section providing a material deforming shoulder, a cylindrical section having a greater lateral dimension than said cutter, and an outwardly radiused section; and a die having a channel formed therein for receiving a portion of said punch and a surface surrounding said channel, said punch and die being cooperable upon axial movement of said punch into the channel of said die to sequentially cut a hole in a flat metal sheet located between the die and the punch and then shape and force the material surrounding the hole against the surface of the die to form a substantially bell-shaped opening having a substantially flat bottom surface spaced from the plane of the sheet material.

2. Apparatus as claimed in claim 1 wherein said flared section defines an inverted truncated conical section.

3. Apparatus as claimed in claim 1 wherein said die includes an upper surface, a cylindrical recess therein for receiving at least a portion of the material surrounding the holes during a hole forming operation, and a channel in communication with said recess for receiving the material cut from the metal sheet.

4. Apparatus as claimed in claim 3 wherein said recess includes an arcuate shoulder defining the outer periphery thereof.

5. Apparatus as claimed in claim 3 wherein said channel includes a pilot portion in axial alignment with said punch for guiding at least a portion of said forming portion through said die.

6. Apparatus as claimed in claim 3 wherein said die includes an annular flange for mounting said die on a support.

7. Hole forming apparatus for punching and forming a reinforced opening of substantially bell-shaped configuration in a substantially flat metal sheet comprising: a punch having a cutting portion at its leading end and a forming portion following said cutting portion; a die having an upper surface, a cylindrical recess formed in said upper surface, said cylindrical recess including an arcuate shoulder defining the outer periphery thereof; and a channel in communication with said recess, said channel including a pilot portion for axially receiving a portion of said punch, said punch and die being cooperable upon axial movement of said punch into the pilot portion of said die to sequentially cut a hole in the flat metal sheet placed between the punch and die and then force and shape the material surrounding the hole against said arcuate shoulder and the surface of said cylindrical recess to form a substantially bell-shaped opening in the metal sheet having a substantially flat bottom surface spaced from the plane of the sheet material, said forming portion including a flared section providing a material deforming shoulder, an outwardly radiused section, and a cylindrical section intermediate said flared section and said radiused section.

8. Hole forming apparatus for punching and forming a reinforced opening of substantially bell-shaped configuration in a substantially flat metal sheet comprising: a punch having a cutting portion at its leading end and a forming portion following said cutting portion; said cutting portion including a cutter extending from the leading end of said punch, and said forming portion including a flared section providing a material deforming shoulder, a cylindrical section having a greater lateral dimension than said cutter, and an outwardly radiused section; a die, said die having an upper surface, a cylindrical recess formed in said upper surface, an arcuate shoulder defining the outer periphery of said cylindrical recess, an axial bore in said die communicating with said recess, said bore including a pilot portion of reduced diameter adjacent to said recess; said punch and die being cooperable upon movement of the leading end of said punch into the pilot portion of said bore to sequentially cut a hole in a metal sheet disposed between the punch and the die and then displace the edge of the hole onto the surface of said cylindrical recess by shaping the material surrounding said hole around said arcuate shoulder and forcing the material onto the surface of said recess to define a substantially bell-shaped opening in the metal sheet having a substantially flat bottom surface spaced from the plane of the sheet material.

9. Apparatus as claimed in claim 7 wherein said cutting portion comprises a cutter extending from the leading end of said punch.

* * * * *